US005325579A

United States Patent [19]

Baier

[11] Patent Number: 5,325,579

[45] Date of Patent: Jul. 5, 1994

[54] METHOD OF MAKING WINDOW ASSEMBLY

[75] Inventor: Bruce A. Baier, Pella, Iowa

[73] Assignee: Pella Corporation, Pella, Iowa

[21] Appl. No.: 877,717

[22] Filed: May 4, 1992

Related U.S. Application Data

[63] Continuation-in-part of Ser. No. 793,475, Nov. 18, 1991.

[51] Int. Cl.$^5$ .......................... B23P 19/00; E06B 3/32

[52] U.S. Cl. ........................................ 29/462; 160/107

[58] Field of Search .................. 29/462, 469; 160/107, 160/172, 180; 52/209

[56] References Cited

U.S. PATENT DOCUMENTS 3,389,737 6/1968 Arnold et al. .
3,562,972 2/1971 D'Amato .......................... 52/209 X
4,274,469 6/1981 Kuyper et al. ...................... 160/107
4,627,206 12/1986 Cox ...................................... 52/209
4,913,213 6/1968 Arnold et al. ...................... 160/107
5,226,466 7/1993 Coddens ............................ 160/107

FOREIGN PATENT DOCUMENTS 1267007 6/1961 France ................................. 52/209

OTHER PUBLICATIONS

By Barnaby Feder "Smart Windows, Intriguing Potential" in The New York Times on Sunday, Apr. 8, 1990, pp. 1-2 Business Section.
"Southwall Introduces First Commercial R-8 Superwindow" in International Solar Energy Intelligence Report on Dec. 29, 1989 p. 259.

*Primary Examiner*—Timothy V. Eley
*Attorney, Agent, or Firm*—Zarley, McKee, Thomte, Voorhees, & Sease

[57] ABSTRACT

A window frame member is substantially pre-manufactured leaving only cutting the mortise and tenon ends of the rail and stile frame members along with cutting the glass stop to the required width. The pre-manufactured frame members include a continuous groove to receive removable glazing panel retention clips. A breather channel opening is cut in the mortise end of the stile frame member avoiding a separate drilling operation. The window frame is versatile and will accommodate multiple window accessories including a muntin grid and light control means such as a blind between two window units. An energy transmittance control system provides a balanced effective control of ultraviolet and near infrared light while maximizing transmission of the visible light. In a three glazing pane window assembly the outer pane includes two transparent silver metal layers while the inner pane includes one silver layer. One silver layer is provided on a stretched polyester film suspended between the outer and middle panes in a krypton filled insulated glass unit.

6 Claims, 9 Drawing Sheets

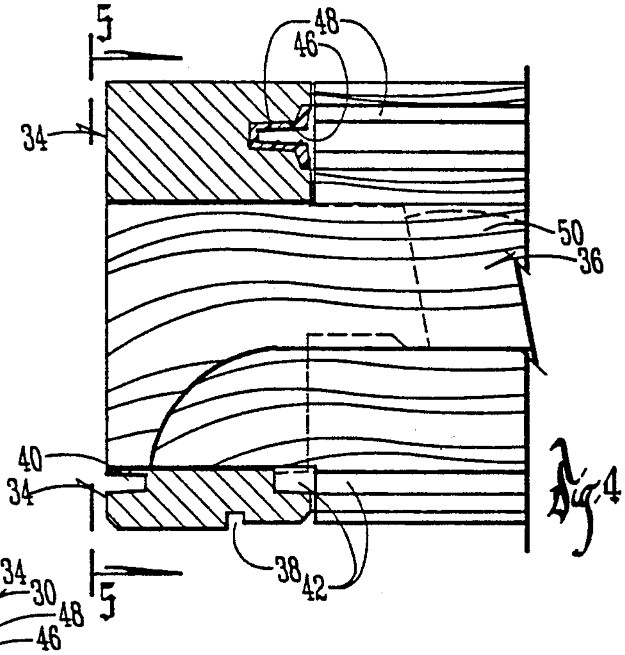
Fig. 4
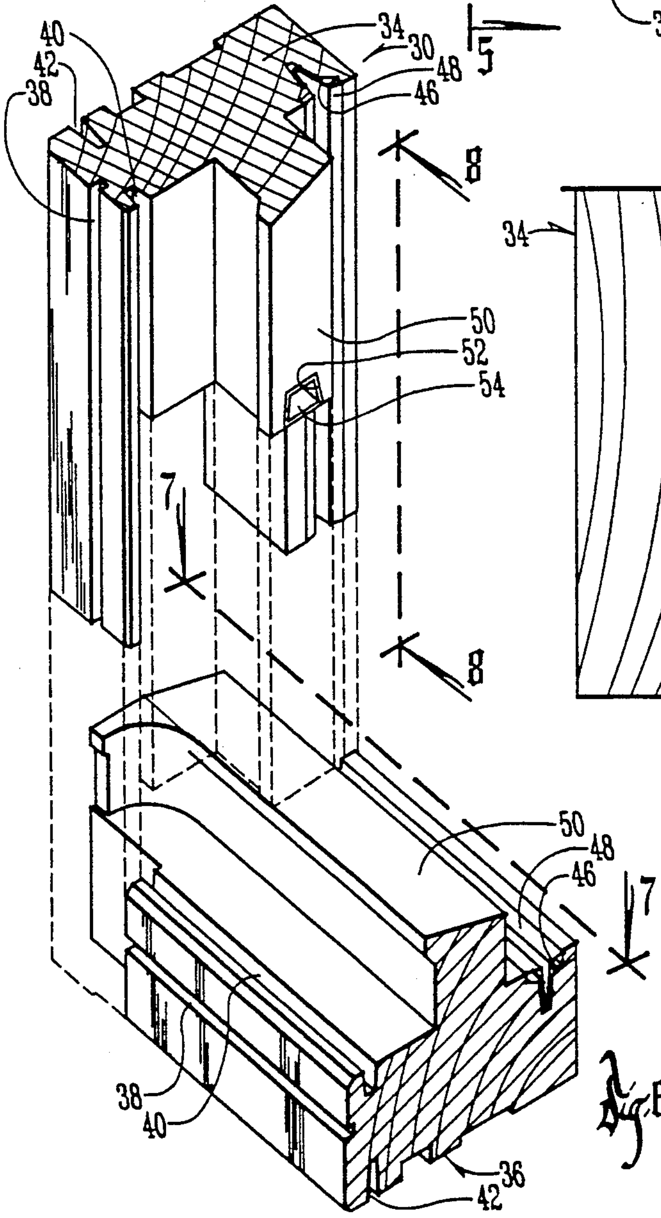
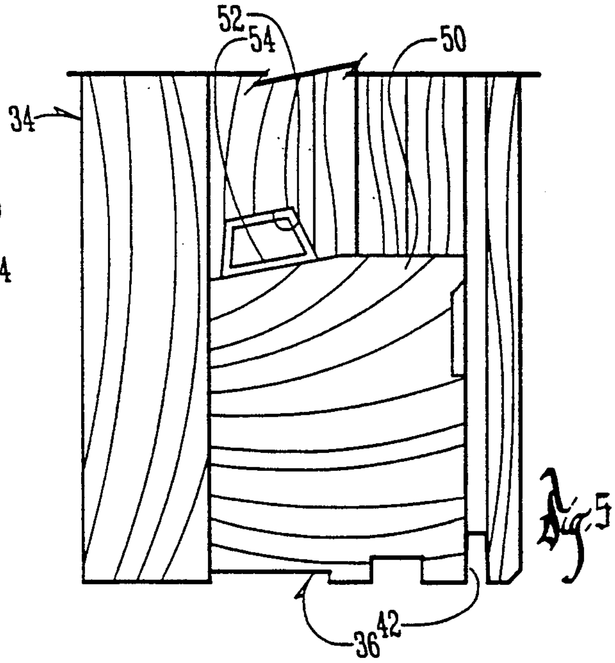
Fig. 5
Fig. 6

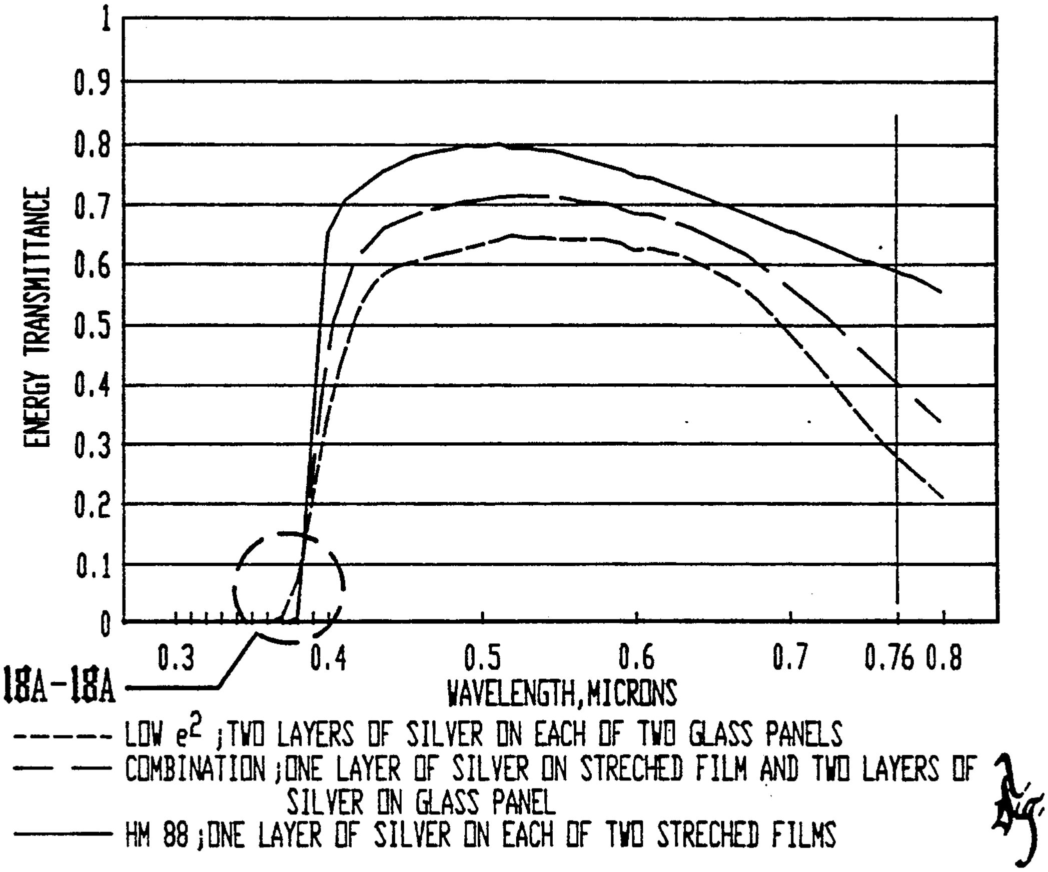

------ LOW $e^2$ ; TWO LAYERS OF SILVER ON EACH OF TWO GLASS PANELS
— — COMBINATION ; ONE LAYER OF SILVER ON STRECHED FILM AND TWO LAYERS OF SILVER ON GLASS PANEL
——— HM 88 ; ONE LAYER OF SILVER ON EACH OF TWO STRECHED FILMS

Fig. 18

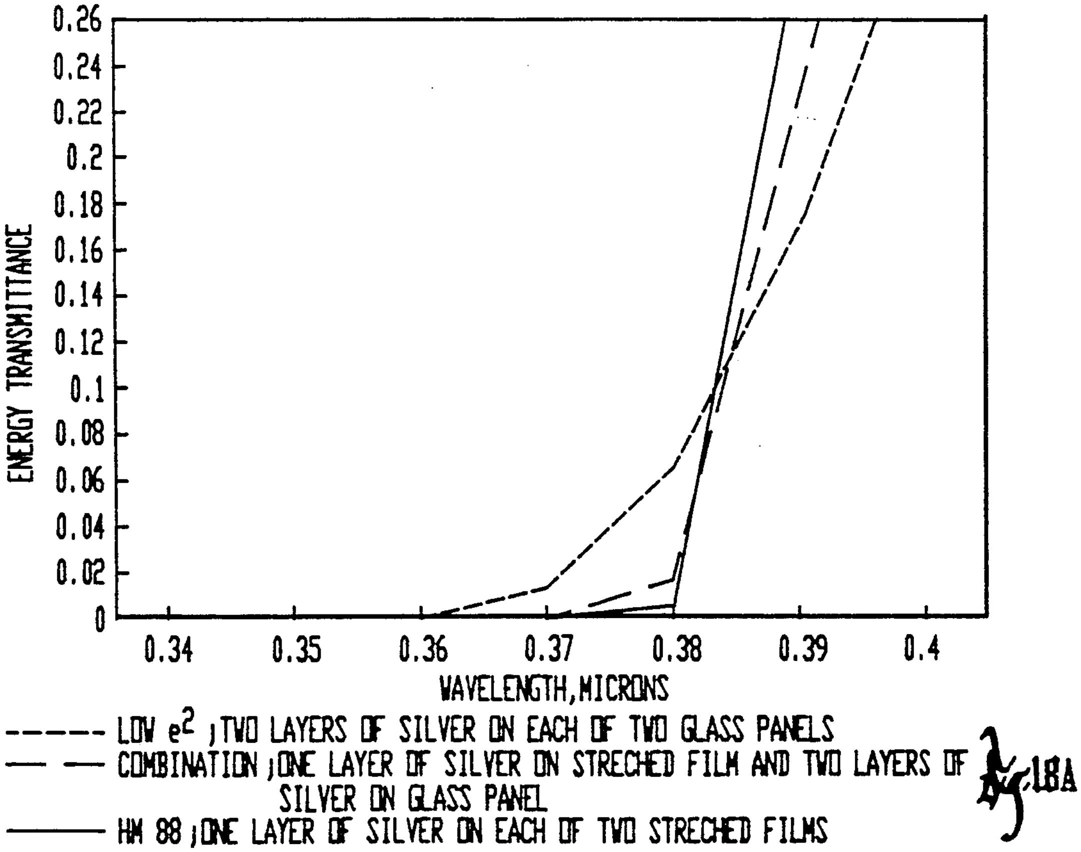

------ LOW $e^2$ ; TWO LAYERS OF SILVER ON EACH OF TWO GLASS PANELS
— — COMBINATION ; ONE LAYER OF SILVER ON STRECHED FILM AND TWO LAYERS OF SILVER ON GLASS PANEL
——— HM 88 ; ONE LAYER OF SILVER ON EACH OF TWO STRECHED FILMS

Fig. 18A

METHOD OF MAKING WINDOW ASSEMBLY

CROSS REFERENCE TO A RELATED APPLICATION

This application is a continuation in part of application Ser. No. 07/793,475 filed Nov. 18, 1991 and entitled WINDOW PANEL WITH BREATHER SYSTEM.

BACKGROUND OF THE INVENTION

This invention relates to an improved and simplified window frame construction that is less expensive to manufacture and allows for the use of optional accessories. A window assembly also includes a highly efficient energy filter system.

The Rolscreen Company, Pella, Iowa, has marketed a window assembly as represented in FIGS. 19-21 which includes a fixed glazing panel 10 and a removable panel 12. Pivot retention clips 14 are carried on removable panel 12 and are received in notches 16 to hold the panel in place. A breather passageway 18 allows ambient outside air to communicate with the space between the glazing panels 10 and 12. The construction of this window requires separate manufacturing steps to form the breather passageway 18 and the notch 16 in the rail frame member 20 and the stile frame member 22. One of the objects of this invention is to simplify this manufacturing procedure so that frame components can be in part mass produced and customized as required with a minimum of manufacturing steps.

The Rolscreen Company has made popular a window assembly having an adjustable blind positioned between the removable inside glazing panel and the outside fixed window unit. While this product has been very successful, it is desirable to have a variety of accessory options if they can be provided at a reasonable cost to manufacture. An objective of this invention thus is to provide a basic window frame construction which allows for final modification at the time of assembly for construction of any number of different accessorized window assemblies which may include multiple accessories between the glazing panels.

In the area of heat and light energy control systems, substantial work has been done in recent years representative of which is disclosed in the Southwall Technologies, Inc., Palo Alto, Calif., Meyer, et al. U.S. Pat. No. 4,799,745, Jan. 24, 1989. While the basic energy transmission control systems are known, improvements are needed in the combining these various systems to give the most affective and efficient system for different environmental conditions. Thus an object of this invention is to uniquely combine certain features of different systems into one to maximize their benefits to the window consumer. It is an object to filter out the ultraviolet light that causes fading while maximizing the transmission of visible light and then again filtering out the near infrared and long wave light. Ultraviolet rays are from 0 to 390 nanometers while the visible region is 390 to 760 and near infrared is from 760 to 2,500. The long wave light is above 2,500. This invention has as an object to provide an energy control system that will filter out as much energy as possible at the top end of the ultraviolet region near its interface with the visible light. This would generally include wave length on the order of 360 to 380 nanometers. It is also an object to strike a balance between the objectives of minimizing near infrared transmission while maximizing visible light.

SUMMARY OF THE INVENTION

This invention allows for the manufacture of an inventory of partially finished stile and rail frame members wherein a minimum of manufacturing steps are required at the time of final window assembly. Component frame members have been provided which due to their construction are suitable for use in a variety of different window models. One example is as an alternative to the individually formed notches 16 to receive the retention clips 14. As seen in FIGS. 3 and 12, a continuous groove is preformed in all of the stile and rail members which will accept the retention clips regardless of their location. A length of frame member may be cut off at any point without the need for forming a retention clip notch that will match up with the removable panel retention clip locations.

This invention also eliminates the need for drilling breather passageways 18 as a final step in the construction of a window assembly. Instead the end cut of the stile member includes a downwardly facing U-shaped passageway that functions as a breather opening and may be protected against moisture by being lined with a plastic sleeve insert. No separate drilling operation is required as the passageway is an integral part of the end cut operation.

The common rail and stile frame members have a width such that they may be utilized with single glazing panels or multiple glazing panels with multiple window accessories such as blinds and muntin bars positioned between the fixed panel and the removable window unit. An upstanding wood stop and spacer extends around the perimeter of the window assembly and its width is determined by the needs of the particular window design that is desired and thus the final routing step will cut away the appropriate amount of material to accommodate the desired accessories and glazing panels. It will be seen that a grid of muntin bars may be removably attached to the inside face of the outside glazing panel while at the same time the space between the two glazing panels can accommodate an adjustable blind. It will also be seen that an insulated glass unit having sealed double glazing panels can be incorporated into a window frame which will also accommodate a third glazing panel which is removable from the inside of the room.

It is believed that the ultimate energy filtering system has been found which maximizes the filtering of undesirable heat and light energy while maximizing the transmission of visible light. This is accomplished by uniquely combining several systems into one window assembly taking advantage of the best features of each system. What is referred to as Low-E2 includes two layers of transparent silver metal on the inside face of the outer glazing panel. In between the two glazing panels of the sealed double glazing panel unit, a single layer of silver metal is provided on a stretched polyester film. This filter is known as Heat Mirror 88 (HM88) and it is distributed by Southwall Technologies, Palo Alto, Calif. A third glazing panel may be used which is removable on the inside of the room and may contain one layer of transparent tin oxide metal. If the insulated glass unit is filled with krypton gas the window assembly will have a center of glass rating of R8.9.

In the past moisture condensation in a nonsealed window assembly where the outside panel was fixed and the inside was removable could be a problem on occasion. This problem is significantly reduced by the window assembly of this invention since the temperature on cold days is significantly raised between the insulated double glazing unit and the removable room side glazing panel. The higher the temperature is in this region the less likely it is that moisture will be a problem.

DESCRIPTION OF THE DRAWINGS

FIG. 4 is a cross sectional view taken along line 4—4 in FIG. 2.

FIG. 5 is a view taken along line 5—5 in FIG. 4.

FIG. 6 is an exploded corner sectional view.

FIG. 18 is an enlarged graphical representation similar to FIG. 17 but of only the ultraviolet and visible regions of the graph.

FIG. 18A is a graphical representation similar to that of FIG. 18 but with the ultraviolet 360–380 nanometer area, indicated by the line 18A—18A in FIG. 18, further enlarged.

DESCRIPTION OF PREFERRED EMBODIMENT

Figure 1:
FIG. 1 is a fragmentary perspective view of a home having a window assembly of this invention.
Figure 3:
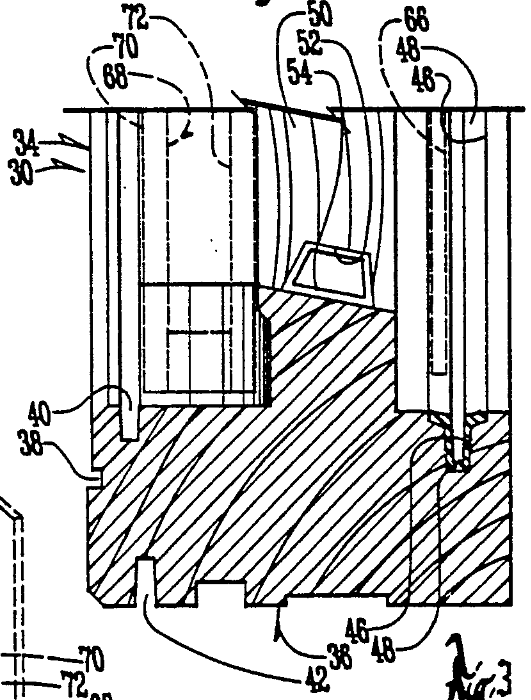
FIG. 3 is a cross sectional view taken along line 3—3 in FIG. 2 and illustrates the continuous preformed retention clip groove and the end cut with breather opening.
Figure 2:
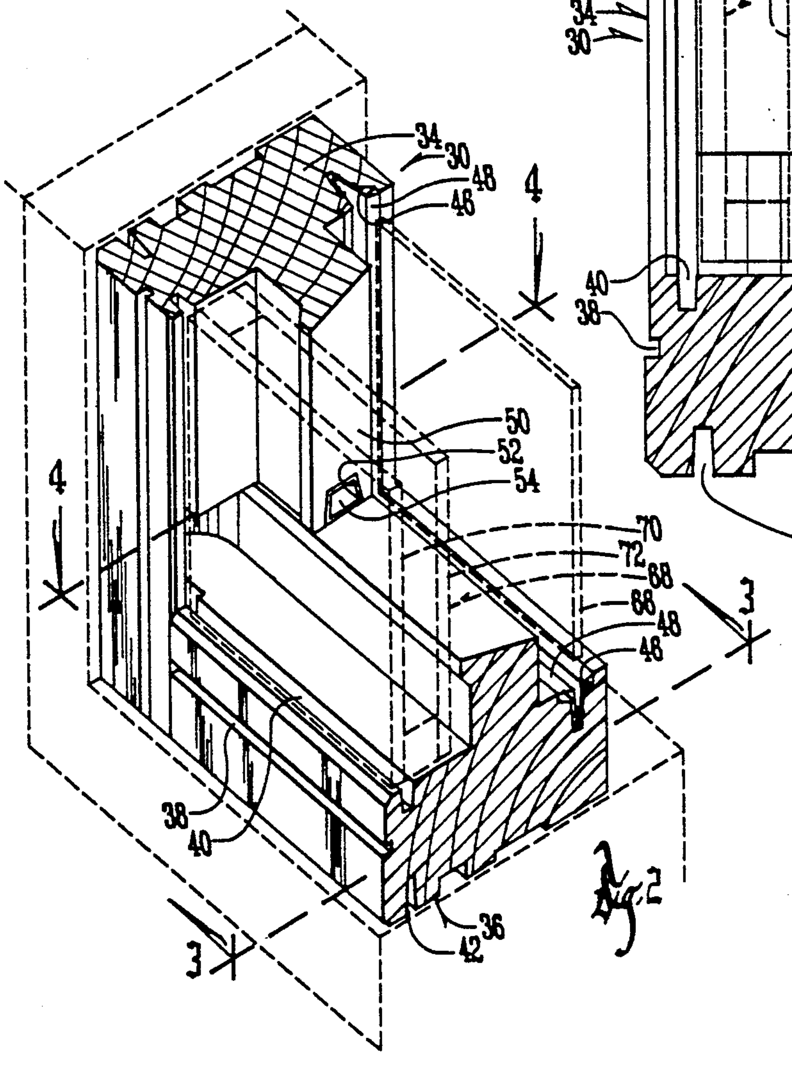
FIG. 2 is a fragmentary perspective view of a corner section of the window unit as indicated by the lines 2—2 in FIG. 1.
Figure 10:
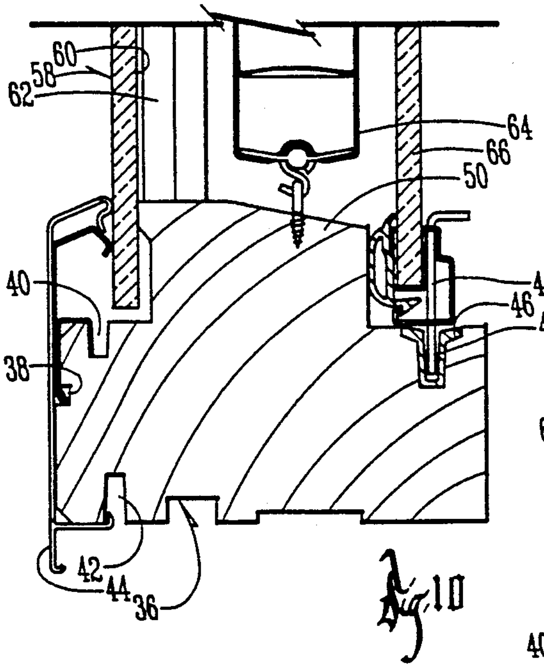
FIG. 10 is a cross sectional view taken along line 10—10 in FIG. 9.
Figure 12:
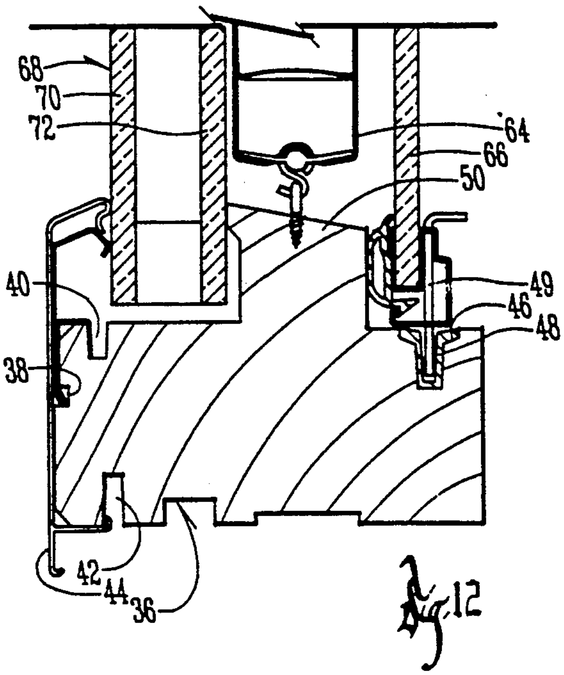
FIG. 12 is a cross sectional view taken along line 12—12 in FIG. 11.
Figure 13:
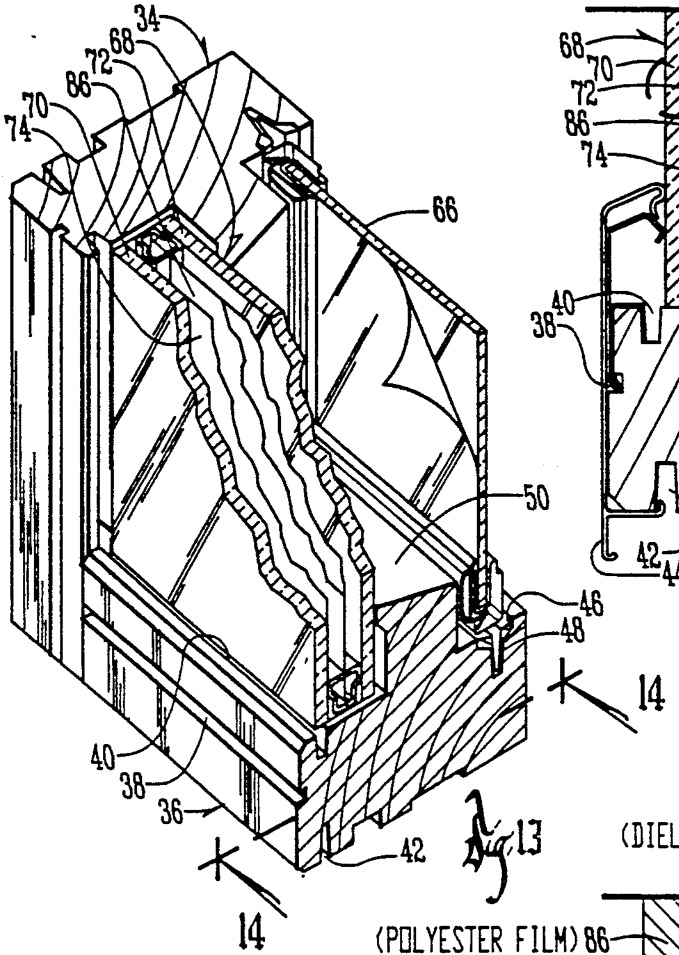
FIG. 13 is a fragmentary perspective view of a corner section illustrating the light and heat energy control systems incorporated into the window assembly.
Figure 14:
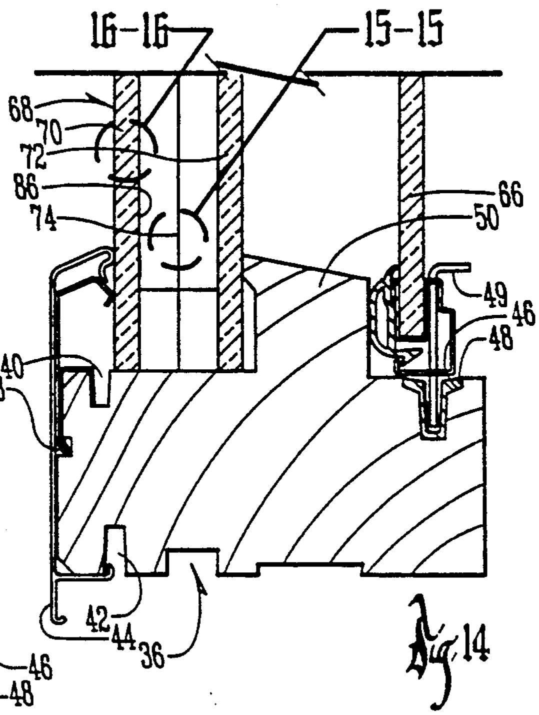
FIG. 14 is a cross sectional view taken along line 14—14 in FIG. 13 with the exterior cladding having been added.

The improved window assembly of this invention is referred to generally by the reference numeral 30 in FIG. 1 where a house 32 is represented. The window frame of this window assembly is illustrated in FIGS. 2–8 and includes a stile frame member 34 joined to a rail member 36. Each of these members are preformed for inventory in lengths that will be subsequently cut to length for a given window. Each of the stile and rail frame members 34 and 36 will include cladding grooves 38, 40 and 42 for attachment of cladding 44 as seen in FIGS. 10 and 12. Additionally a continuous V-shaped clip retention groove 46 is formed in the wood frame members and is provided with a plastic liner 48 to receive a pivotable retention clip 49 as seen in FIGS. 10 and 12. A glass stop 50 is provided intermediate the opposite sides of the frame members and its width will be cut to size depending on the requirements of a particular window assembly.

Figure 7:
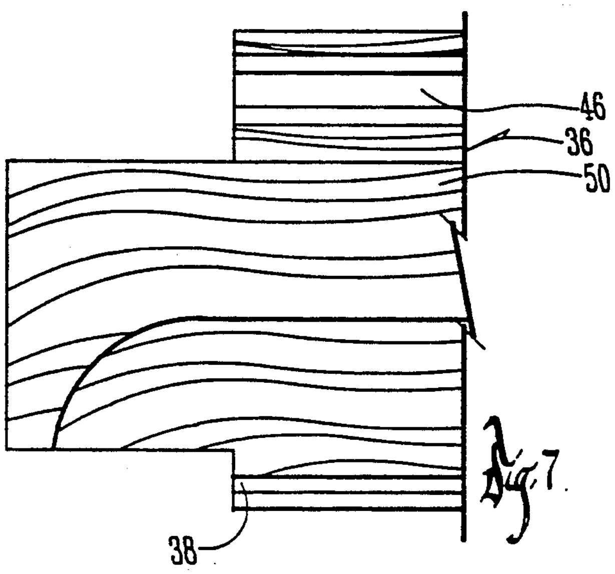
FIG. 7 is a fragmentary top plan view of the end of the rail member showing its end cut.
Figure 8:
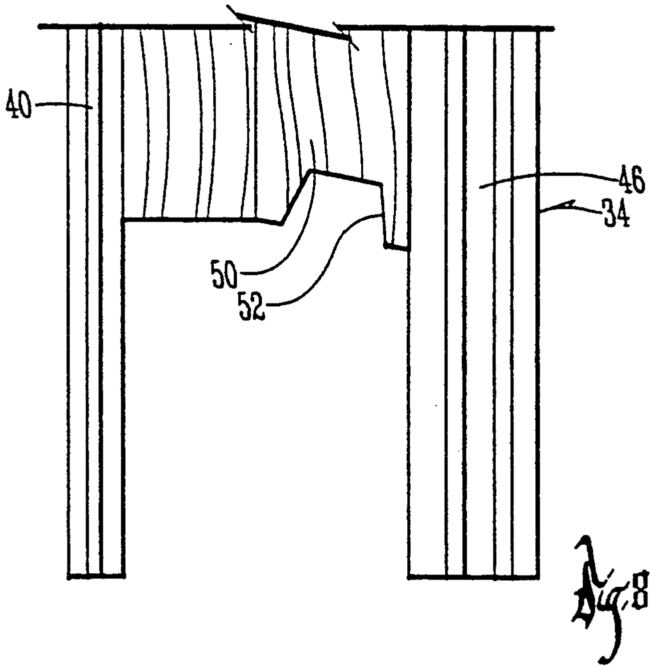
FIG. 8 is a view taken along line 8—8 in FIG. 6 of only the lower end of a stile member showing the end cut.
Figure 9:
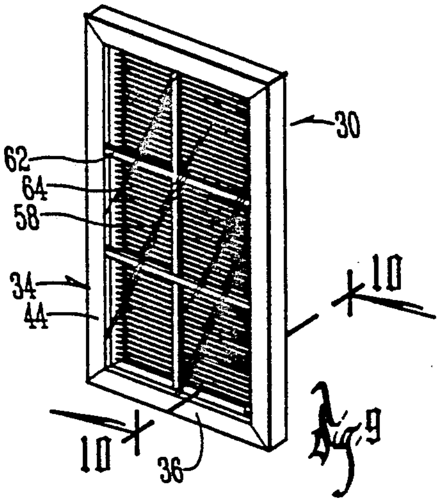
FIG. 9 is a perspective view of an assembled window assembly which includes an internal muntin bar grid along with an adjustable blind.
Figure 11:
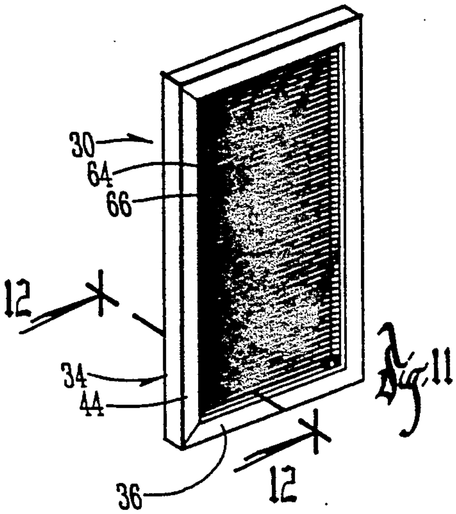
FIG. 11 is a perspective view of a window assembly having a sealed double glazing window unit and a removable glazing panel with an adjustable blind therebetween.
Figure 19:
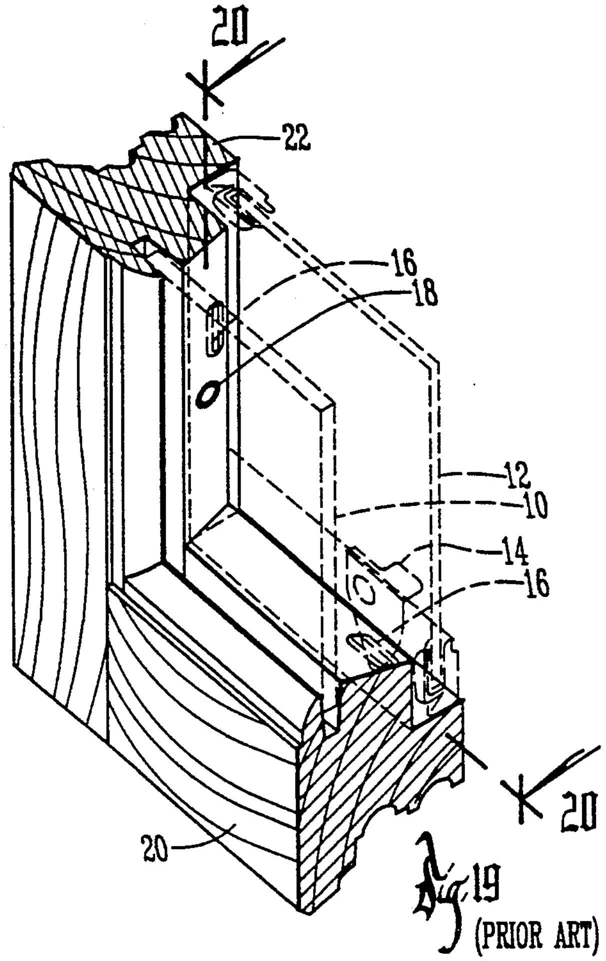
Fig. 19 (PRIOR ART)
FIG. 19 is a fragmentary cross sectional view of a window assembly corner illustrating the prior art on which this invention is an improvement.
Figure 20:
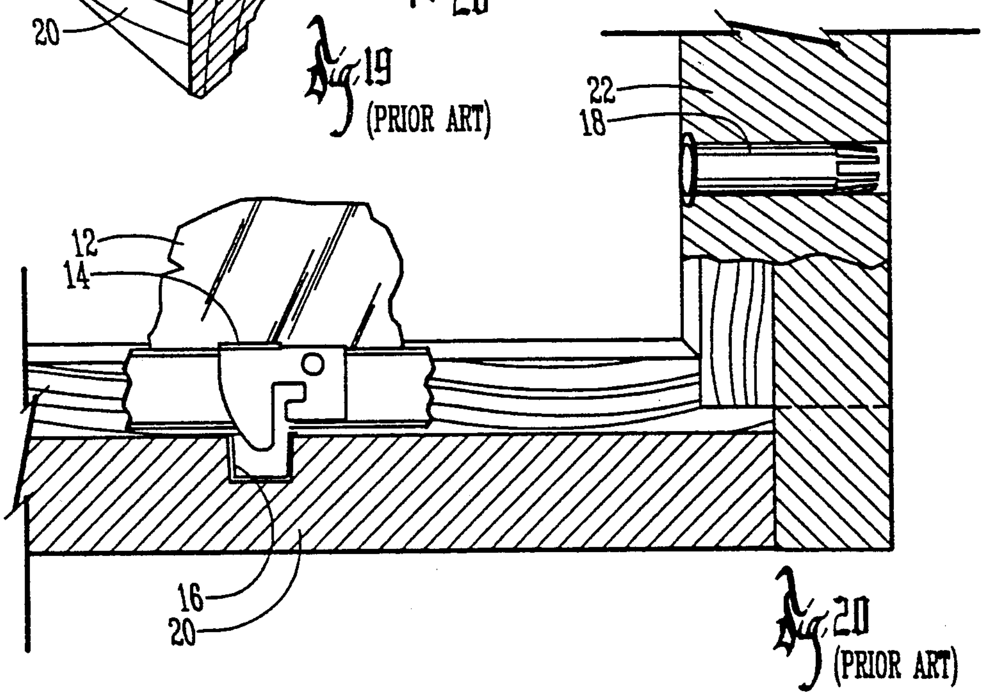
Fig. 20 (PRIOR ART)
FIG. 20 is a cross sectional view taken along line 20—20 in FIG. 19.
Figure 21:
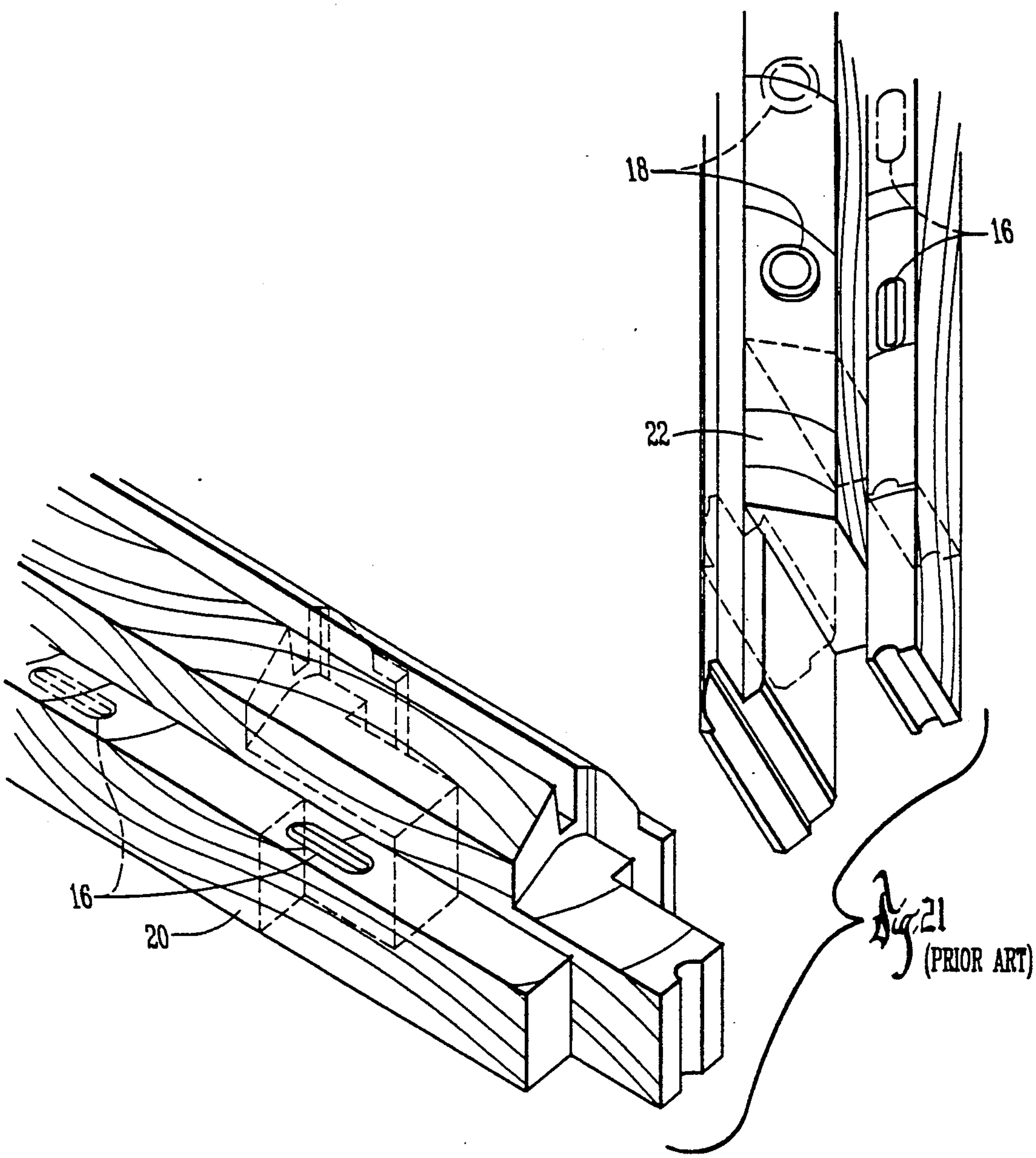
Fig. 21 (PRIOR ART)
FIG. 21 is an exploded fragmentary view of the stile and rail frame members of the prior art devices of FIGS. 19 and 20.

The glass stop 50 in the stile frame member 34 will include a routed breather channel 52 which is formed at the same time the preassembled mortise end cut is made as seen in FIG. 8. The tenon end cut of the rail member 36 is seen in FIG. 7. A breather sleeve 54 is fitted into the channel 52 and rests upon the top face of the glass stop 50 of the rail member 36. Thus it is seen that it is unnecessary as in the prior art shown in FIGS. 19–21 to cut notches 16 for the retention clips 14 or new breather openings 18 each time a window assembly of a different dimension is constructed.

In FIGS. 9–12 alternative window constructions are seen possible utilizing the basic frame components which make up the rail frame members 36 shown. In FIG. 10 an exterior glazing panel 58 includes on its inside face 60 a muntin bar grid 62 and next to it is an adjustable blind 64. A removable interior glazing panel 66 is held in place by retractable retention clips 49 received in the continuous retention groove 46. The width of the glass stop 50 is cut to the appropriate size and varies as seen in the two embodiments of FIGS. 10 and 12. In FIG. 12 an insulated double pane panel 68 is substituted for the single glazing panel 58 and the blind 64 is positioned between the panel 68 and the removable panel 66.

The energy filter control system of this invention is illustrated in FIGS. 13–16. The insulated double glazing panel 68 includes a pair of glass panes 70 and 72. The glazing 70 includes a coating 74 seen in FIG. 16. This coating is seen to include two transparent silver layers 76 and 78 with zinc oxide dielectric layers on the outside at 80, in between at 82 and next to the glass 70 at 84. This coating 74 is referred to by the Rolscreen Company as Low-E2 spoken as "low E squared". Glass with this coating on it is provided by Cardinal Glass, Minneapolis, Minn.

Figure 15:
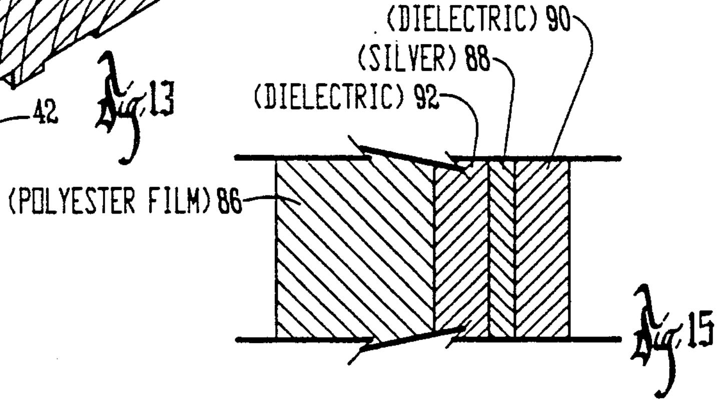
FIG. 15 is an enlarged cross sectional view generally of the transparent silver metal film as indicated by the line 15—15 in FIG. 14.
Figure 16:
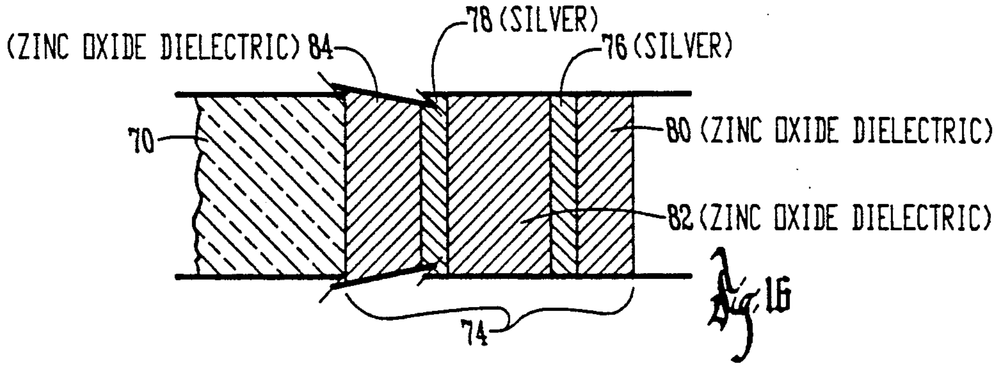
FIG. 16 is a view similar to FIG. 15 but illustrating the cross sectional construction of the double silver metal layers on the interior face of the outer glazing panel in an insulated double glazing window unit as indicated by the line 16—16 in FIG. 14.

Suspended between the glazing panes 70 and 72 is a clear polyester film 86 with a coating of silver 88 sandwiched between dialectic layers 90 and 92 as seen in FIG. 15. The inner glazing pane 72 of the sealed panel 68 is clear glass. The film 86 is sold by Southwall Technologies, Inc., Palo Alto, Calif., as Heat Mirror 88.

The removable panel 66 preferably includes a Low-E coating which has one layer of transparent tin oxide metal. With the insulated panel 68 being filled with krypton the window assembly will carry an R8.9 rating.

Figure 17:
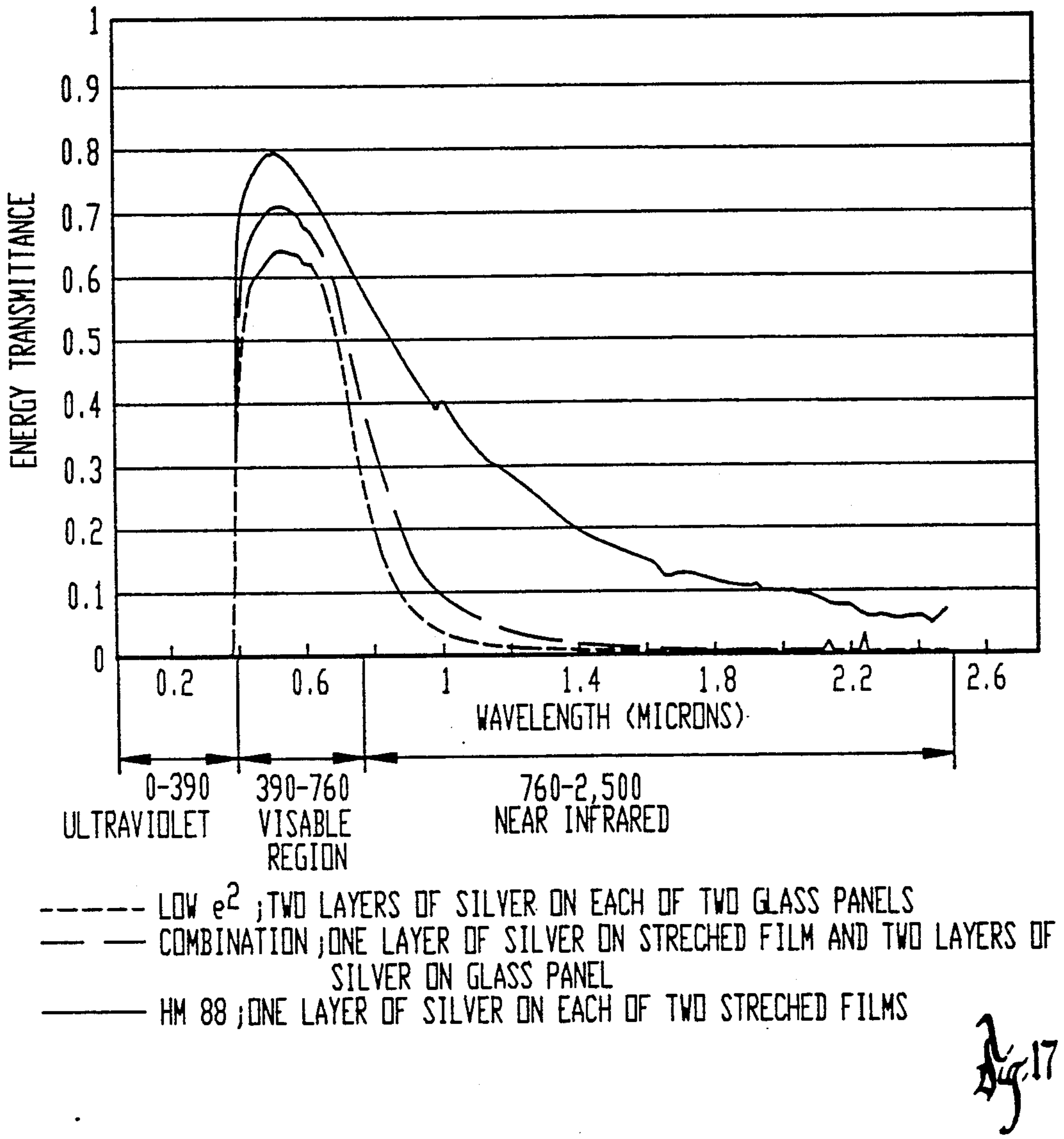
FIG. 17 is a graphical representation of the energy transmittance control system of this invention as compared to two alternate systems.

As previously indicated, it is an objective of the energy control filtering system to maximize the transmitted light in the visible region of 390–760 nanometers while filtering out as much of the ultraviolets 0–390 and near infrared 760–2,500 as possible. It is believed that this invention has accomplished these objectives. The performance of the combined Low-E2 and HM88 system is shown in contrast to two alternate systems in FIGS. 17, 18 and 18A. A system comprising two Low-E2 coatings on separate panes of glass is represented as one alternative. The other alternative is two HM88 stretched polyester films. It is seen that the combination system of this invention filters out the ultraviolet light in the 360 to 380 range whereas the two Low-E2 system did not. Failure to filter these wave lengths of light can result in significant fading of fabrics. It is next seen that the combination system is approximately half way between the other two systems in the visible light region of 390–760. In the near infrared region the combination system is very close to the two Low-E2 system and is substantially better that the two HM88 system which allows considerably more energy transmittance. Accordingly, it is believed that the best features of several systems have been uniquely combined to provide a superior energy transmittance control system.

What is claimed is:

1. The method of making window assemblies comprising the steps of, preparing an inventory of extended length stile and rail frame members each of which includes a retention groove extending the substantial length thereof, determining the size of the window unit to be installed in the assembled stile and rail frame members and the length of the required stile and rail frame members, cutting tenon and mortise ends on said stile and rail frame members, connecting said stile and rail frame members to form a window assembly frame with said retention grooves being in a common plane, positioning a window unit having retention means in the assembled window frame, and moving a plurality of spaced apart removable window unit retention means into said retention grooves to releaseably lock said window unit in said window assembly frame.

2. The method of claim 1 wherein the step of cutting tenon and mortise ends on said stile and rail frame members includes the step of cutting a breather opening channel in the mortise end of one stile frame member whereby when connected to a rail tenon end a breather opening passageway is provided by said rail tenon functioning as a sidewall for said passageway.

3. The method of claim 3 and the step of inserting a moisture resistant breather sleeve in said breather opening passageway to provide moisture resistance protection to a wood window assembly.

4. The method of making a window assembly comprising the steps of, cutting tenon ends on rail frame members, cutting mortise ends on stile frame members of which one end of one stile frame member includes a breather opening channel, and connecting said stile and rail frame members to form a window assembly frame with the tenon on the rail frame member end connected to the stile frame member end having the channel forming a sidewall of a passageway which includes the channel to provide continuous side walls around said passageway.

5. The method of claim 4 and the step of providing a window unit assembly in said window assembly frame that includes an insulating air space between a pair of glazing panels and said passageway extends from said insulating air space to ambient air on the outside of the window assembly.

6. The method of claim 5 and the step of inserting a moisture resistant breather sleeve in said passageway to provide moisture resistance protection to a wood window assembly.

* * * * *